Patented Jan. 11, 1944

2,338,892

UNITED STATES PATENT OFFICE 2,338,892

SHELLAC NAPHTHENATE OPERATIVE AS PLASTICIZER IN VARNISHES, PAINTS, AND LACQUERS

Henry Hall Bassford, Jr., Brooklyn, N. Y., assignor to U. S. Shellac Importers Association, Inc., New York, N. Y., a corporation of New York No Drawing. Application May 15, 1942, Serial No. 443,166

5 Claims. (Cl. 260—97)

This invention relates to new compositions of matter, consisting of esters of naphthenic acids with shellac, and to the use of these products as plasticizers for lacquers, varnishes and paints.

Shellac contains both hydroxyl and carboxylic acid groupings. Two types of shellac esters have been prepared by various investigators. The first type, in which the shellac functioned as a carboxylic acid, were prepared by esterifying the carboxyl groups with aliphatic alcohols. The second type, in which the shellac functioned as a polyhydric alcohol, were prepared by reacting the hydroxyl groups with acids such as rosin (abietic acid), straight-chain fatty acids and drying oil acids. (U. S. 1,910,100; London Shellac Research Bureau, Tech. papers No. 12 (1937) and No. 15 (1938); J. Soc. Chem. Ind. 57, 285-8 (1938), 59, 325-8 (1940); Rev. Gen. Mat. Plastiques 15, 47-9, 65-7 (1939); Paint Tech. 3, 189-90 (1938).) Insofar as I am aware, however, the prior teachings with respect to shellac naphthenates, and on the reaction products of shellac with naphthenic acids capable of being used as plasticizers for alcohol shellac varnish and the like is non-existent.

It is an object of this invention to prepare naphthenic acid esters of shellac. A second object is the preparation of varnishes containing these esters which shall have improved flexibility and adhesion on aging. Further objects of my invention will become apparent as the description proceeds.

The first of these objects may be accomplished by any of the usual processes of esterification but is readily attained by dissolving the shellac in the naphthenic acid or mixture of naphthenic acids and heating the solution to an elevated temperature. The naphthenic acid reacts with the hydroxyl groups of the shellac. The product therefore belongs to the second class of shellac esters described earlier, in which shellac behaves as a polyhydric alcohol. The second object is achieved by incorporating the reaction product of shellac with naphthenic acid or acids (either crude or free of unreacted naphthenic acid) in the appropriate varnish in sufficient amount to give the desired toughness and flexibility.

The term "shellac" is taken to include all forms of lac, the secretion of the insect, *Tachardia lacca* Kerr, whether in raw, refined or manufactured form. Modified lac is taken to include all forms of lac which have been materially modified by chemical means, such as "bleached shellac," "refined bleached shellac," "hard lac" and the like.

The term "a naphthenic acid," as referred to in this application and the appended claims, is intended to include not only naphthenic acid itself, but also its homologues and substitution derivatives.

The following discussion will make clear the nature and properties of the products described by this application and their advantages as compared to existing materials.

Alcoholic shellac solutions enjoy a wide field of use as coating and binding materials, for example as floor varnishes, furniture lacquers, metal, paper and candy coatings, wood and paper sizes and the like. Shellac is incorporated in nitrocellulose lacquers to impart gloss, depth of finish and resistance to ultra-violet light. Pigmented shellac varnishes are employed as quick drying enamels. The major objection to shellac for the uses described above is that its films become brittle upon thorough drying, tend to craze and lose their toughness and adhesion. A further drawback to the use of shellac in lacquer is the low tolerance of shellac solutions for hydrocarbon solvents. Of the commercial plasticizing materials only a few impart permanent flexibility to alcoholic shellac varnish. Furthermore the best of these plasticizers are relatively expensive and unavailable.

I have found, however, that shellac naphthenates are particularly effective as plasticizing agents since they remain permanently soft and flexible. At the same time their unique structure embodying both polar and hydrocarbon groupings makes them compatible with a wide variety of resins and solvents. I have found them to be ideal plasticizers for alcohol shellac varnish and for nitrocellulose lacquers containing shellac. In the case of alcohol solutions of native shellac, the shellac naphthenates exert a solubilizing effect on the shellac wax, with the result that the films are much clearer, level better and possess superior gloss. The shellac naphthenates, due to their property of excellent secondary flow, generally improve the binding, spreading and levelling characteristics of varnishes and lacquers. For this reason they should be of especial worth in spraying lacquers which tend to orange peel.

The following example, in which parts are given by weight, is illustrative of this invention:

10 parts of commercial naphthenic acids obtained from petroleum are heated to about 140° C. 20 parts of shellac are added with stirring over a two minute period, preferably maintaining the temperature between 130 and 140° C. After the addition of the shellac, the mixture is stirred and heated at approximately 150-155° C. for two minutes. The product is then thinned with an equal weight of ethyl alcohol. (The alcohol is added a few drops at a time so that it evaporates and cools the reaction mixture.) The resulting alcohol solution containing equal weights of alcohol and shellac-napththenic acid reaction product may be used as a plasticizer for alcohol shellac varnish as follows: To 10 parts by weight of a 4# alcohol shellac varnish, containing 4 parts by weight of orange shellac, are added 8 parts by weight of the 50% alcoholic shellac naphthenate solution. The resulting solution has excellent brushing and leveling properties, and yields clear films which possess excellent gloss. This result is apparently due to the solubilizing effect of the plasticizer on the shellac wax present in the orange shellac. The films prepared above are air-dried overnight, conditioned for one hour at 110° C., and then bent around a ⅛" mandrel. The films containing shellac naphthenate plasticizer are not affected by this treatment, whereas films prepared using the unplasticized shellac varnish craze, peel in places and show white striations along the entire bend.

As many widely different embodiments of this invention may be made without departing from the spirit and scope thereof, it is to be understood that I do not limit myself to the specific embodiments thereof except as defined in the appended claims.

Having described my invention, what I claim and desire to secure by Letters Patent is as follows:

1. The naphthenic acid ester of shellac, operative as a plasticizer for shellac varnish.

2. The reaction product of shellac with a naththenic acid, operative as a plasticizer for shellac varnish.

3. The method of preparing a shellac naphthenate, operative as a plasticizer in shellac varnish in which the shellac is dissolved in naphthenic acid and heated to a temperature of at least 150° C. to effect reaction.

4. An alcohol varnish containing shellac and a naphthenic acid ester of shellac.

5. A paint containing shellac, a naphthenic acid ester of shellac, a pigment and solvent.

HENRY HALL BASSFORD, JR.